(12) United States Patent
Sato (10) Patent No.: US 9,527,524 B2
(45) Date of Patent: Dec. 27, 2016

(54) POWER STEERING APPARATUS AND METHOD OF ASSEMBLING SAME

(71) Applicant: Showa Corporation, Gyoda-shi (JP)

(72) Inventor: Kaduto Sato, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/550,342

(22) Filed: Nov. 21, 2014

(65) Prior Publication Data

US 2015/0274198 A1   Oct. 1, 2015

(30) Foreign Application Priority Data

Mar. 27, 2014   (JP) ................. 2014-065290

(51) Int. Cl.
| | |
|---|---|
| *B62D 5/04* | (2006.01) |
| *F16H 57/023* | (2012.01) |
| *B62D 3/12* | (2006.01) |
| *F16H 57/02* | (2012.01) |

(52) U.S. Cl.
CPC ............. *B62D 5/0421* (2013.01); *B62D 3/12* (2013.01); *F16H 57/023* (2013.01); *F16H 2057/02021* (2013.01); *F16H 2057/02034* (2013.01); *F16H 2057/02082* (2013.01); *Y10T 29/49464* (2015.01)

(58) Field of Classification Search
CPC ....... B62D 5/0421; B62D 3/12; F16H 57/023; F16H 2057/02021; F16H 2057/02034; F16H 2057/02082
USPC .................................................. 180/443, 444
See application file for complete search history.

(56) References Cited

U.S. PATENT DOCUMENTS

2007/0107975 A1 * 5/2007 Onishi ................. B62D 5/0403
180/444

FOREIGN PATENT DOCUMENTS

| JP | 02-021346 Y | | 6/1990 |
|---|---|---|---|
| JP | 2004-243988 A | | 9/2004 |
| JP | 2004243988 A | * | 9/2004 |
| JP | 2013071684 A | * | 4/2013 |

* cited by examiner

*Primary Examiner* — Jacob Knutson
(74) *Attorney, Agent, or Firm* — Leason Ellis LLP (57) ABSTRACT

A power steering apparatus of the disclosure includes a rack shaft; a steering wheel-side pinion shaft that rotates as a steering wheel is turned; an assist side pinion shaft that is driven to rotate by a drive unit, thereby assisting the rotation of the steering wheel-side pinion shaft; and a gear housing that accommodates the rack shaft, and has a second leg portion fixed to a vehicle. The gear housing includes a first housing that accommodates a meshing portion between the rack shaft and the steering wheel-side pinion shaft; a second housing that accommodates a meshing portion between the rack shaft and the assist side pinion shaft; and a third housing that is provided with the second leg portion.

16 Claims, 8 Drawing Sheets

| NAME OF MEMBER | LOCATION OF CONNECTION | MEMBER OF GEAR HOUSING 10 |
| --- | --- | --- |
| FIRST LEG PORTION 10D | VEHICLE BODY FRAME 9 | FIRST HOUSING 10A |
| SECOND LEG PORTION 10E | | THIRD HOUSING 10C |
| STEERING WHEEL-SIDE PINION SHAFT 23 | RACK SHAFT 24 | FIRST HOUSING 10A |
| ASSIST SIDE PINION SHAFT 33 | | SECOND HOUSING 10B |

POWER STEERING APPARATUS AND METHOD OF ASSEMBLING SAME

This application claims priority from Japanese Patent Application No. 2014-065290 filed with the Japan Patent Office on Mar. 27, 2014, the entire content of which is hereby incorporated by reference.

BACKGROUND OF THE INVENTION

1. Field of the Invention

The present invention relates to a power steering apparatus and a method of assembling the power steering apparatus.

2. Description of Related Art

In a motor-driven power steering apparatus (EPS) that is an example of a steering apparatus for a vehicle, the examples of an EPS having a rack and pinion steering gear include a pinion assistance EPS that drives a pinion meshing with a rack shaft, a rack assistance EPS that drives the rack shaft itself, and the like.

Here, typically, in the pinion assistance EPS, an electric motor drives the pinion based on a steering torque. The pinion assistance EPS has a problem in that a steering gear box increases in size due to the installation of the electric motor, thereby limiting the mounting of the EPS in a vehicle, or the arrangement of the EPS in an engine room.

A dual pinion EPS is proposed in which a pinion driven by an electric assisting mechanism is provided separately from a pinion connected to a steering shaft, and the electric motor can be disposed at a desired position on the rack shaft (refer to JP-UM-B-02-021346 as an example).

SUMMARY OF THE INVENTION

In the power steering apparatus having a first pinion shaft and a second pinion shaft, the rack shaft is provided with a rack that meshes with the pinion of the first pinion shaft rotating as a steering unit is turned, and a rack that meshes with the pinion of the second pinion shaft driven by a drive unit. The racks mesh respectively with the pinions of the first pinion shaft and the second pinion shaft, but for example, the racks may not well mesh with the pinions, respectively, due to variations in position of each of the respective racks on the rack shafts. The following countermeasure method is proposed. Housings are separately manufactured, on which the first and second pinion shafts are respectively provided, and a relative position between separate housings is adjusted while the housings are rotated in a circumferential direction of the rack shaft. However, the position of a fixed portion used to fix the housing to a fixture or the like deviates from its original position, in association with the rotation in the circumferential direction, and thus the attachment precision of the power steering apparatus may deteriorate.

An object of the present invention is to prevent deterioration in attachment precision of a power steering apparatus while maintaining good meshing of a rack and a pinion.

According to an aspect of the present invention, there is provided a power steering apparatus including a rack shaft that has a rack and moves a steered unit; a first pinion shaft that has a first pinion meshing with the rack of the rack shaft, and rotates as a steering unit is turned; a second pinion shaft that has a second pinion meshing with the rack of the rack shaft, and is driven to rotate by a drive unit, thereby assisting the rotation of the first pinion shaft; and a housing that accommodates the rack shaft, and has a fixed portion fixed to a vehicle. The housing includes a first housing portion that accommodates a meshing portion between the rack shaft and the first pinion shaft; a second housing portion that is a separate body from the first housing portion, and accommodates a meshing portion between the rack shaft and the second pinion shaft; and a third housing portion that is a separate body from the first and second housing portions, and is provided with the fixed portion.

Here, any one of the first and second housing portions may have another fixed portion attached to the vehicle.

The first housing portion may have the other fixed portion.

The first housing portion may be provided opposite to the third housing portion in an axial direction of the rack shaft with the second housing portion interposed between the first and third housing portions.

Each of the first to third housing portions may include a fixing mechanism through which each of the relative positions among the first to third housing portions can be changed in a circumferential direction of the rack shaft.

According to another aspect of the present invention, there is provided a method of assembling a power steering apparatus including a rack shaft that has a rack and moves a steered unit; a first pinion shaft that has a first pinion meshing with the rack of the rack shaft, and rotates as a steering unit is turned; a second pinion shaft that has a second pinion meshing with the rack of the rack shaft, and is driven to rotate by a drive unit, thereby assisting the rotation of the first pinion shaft; and a housing that accommodates the rack shaft, and has a plurality of fixed portions fixed to a vehicle. The housing includes a first housing portion that accommodates a meshing portion between the rack shaft and the first pinion shaft, and that is provided with a first fixed portion; a second housing portion that is a separate body from the first housing portion, and that accommodates a meshing portion between the rack shaft and the second pinion shaft; and a third housing portion that is a separate body from the first and second housing portions, and that is provided with a second fixed portion. The method includes a step of fixing the first fixed portion of the first housing portion to a fixture; a step of fixing the second fixed portion of the third housing portion to the fixture; and a step of adjusting the meshing between the rack shaft and the first pinion shaft, and then adjusting the meshing between the rack shaft and the second pinion shaft.

The first housing portion may be provided opposite to the third housing portion in an axial direction of the rack shaft with the second housing portion interposed between the first and third housing portions.

After an adjustment is performed on the meshing between the first pinion shaft and the rack shaft which is supported by the first and third housing portions, the respective first and second fixed portions of which are fixed to the fixture, the position of the second housing portion is adjusted, thereby adjusting the meshing of the second pinion shaft with respect to the rack shaft.

According to the aspects of the present invention, it is possible to prevent deterioration in attachment precision of the power steering apparatus while maintaining good meshing of the rack and pinions.

DETAILED DESCRIPTION OF THE INVENTION

Hereinafter, embodiments of the present invention will be described in detail with reference to the accompanying drawings.

Entire Configuration of Power Steering Apparatus

Figure 1:
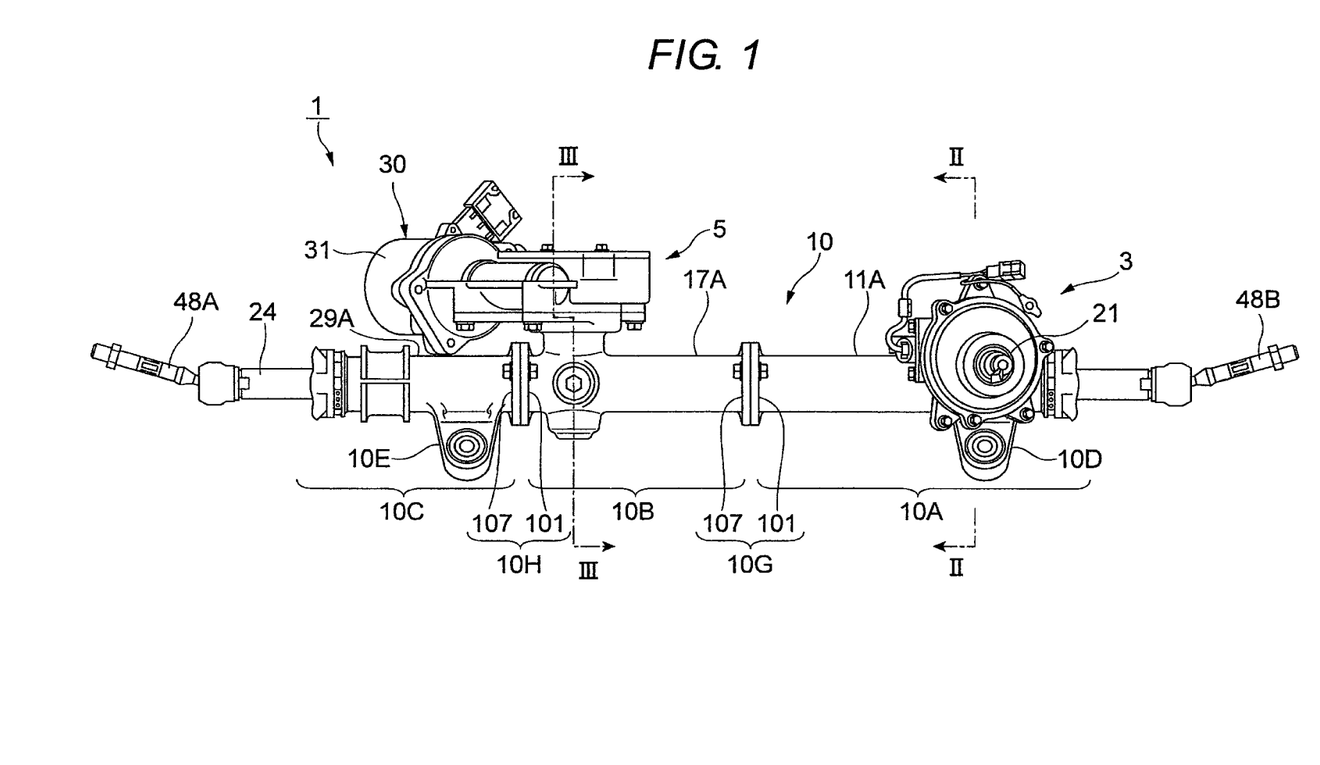
FIG. 1 is a schematic top view of a motor-driven power steering apparatus of an embodiment.
Figure 2:
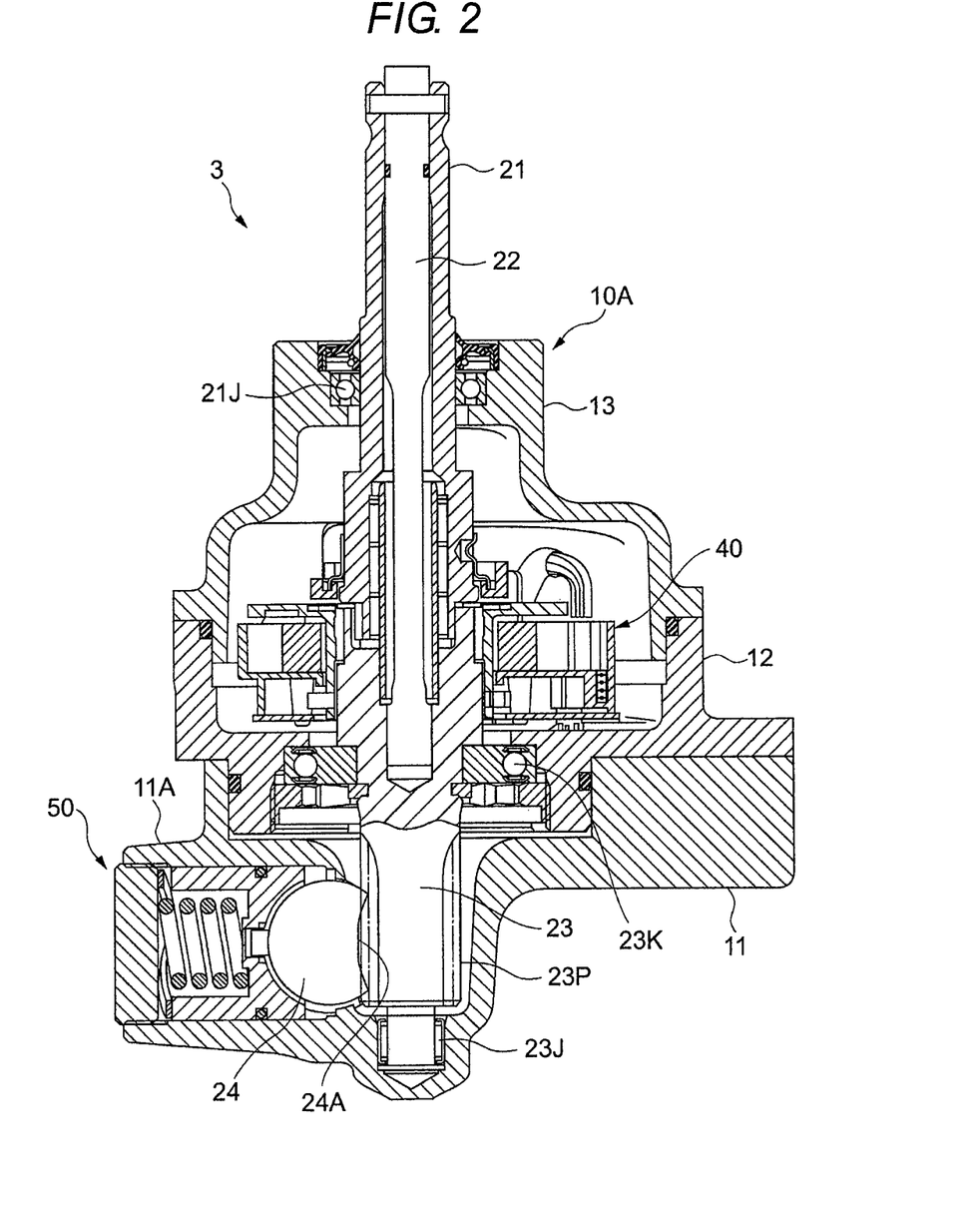
FIG. 2 is a configuration view illustrating a transmission mechanism unit of the motor-driven power steering apparatus of the embodiment.
Figure 3:
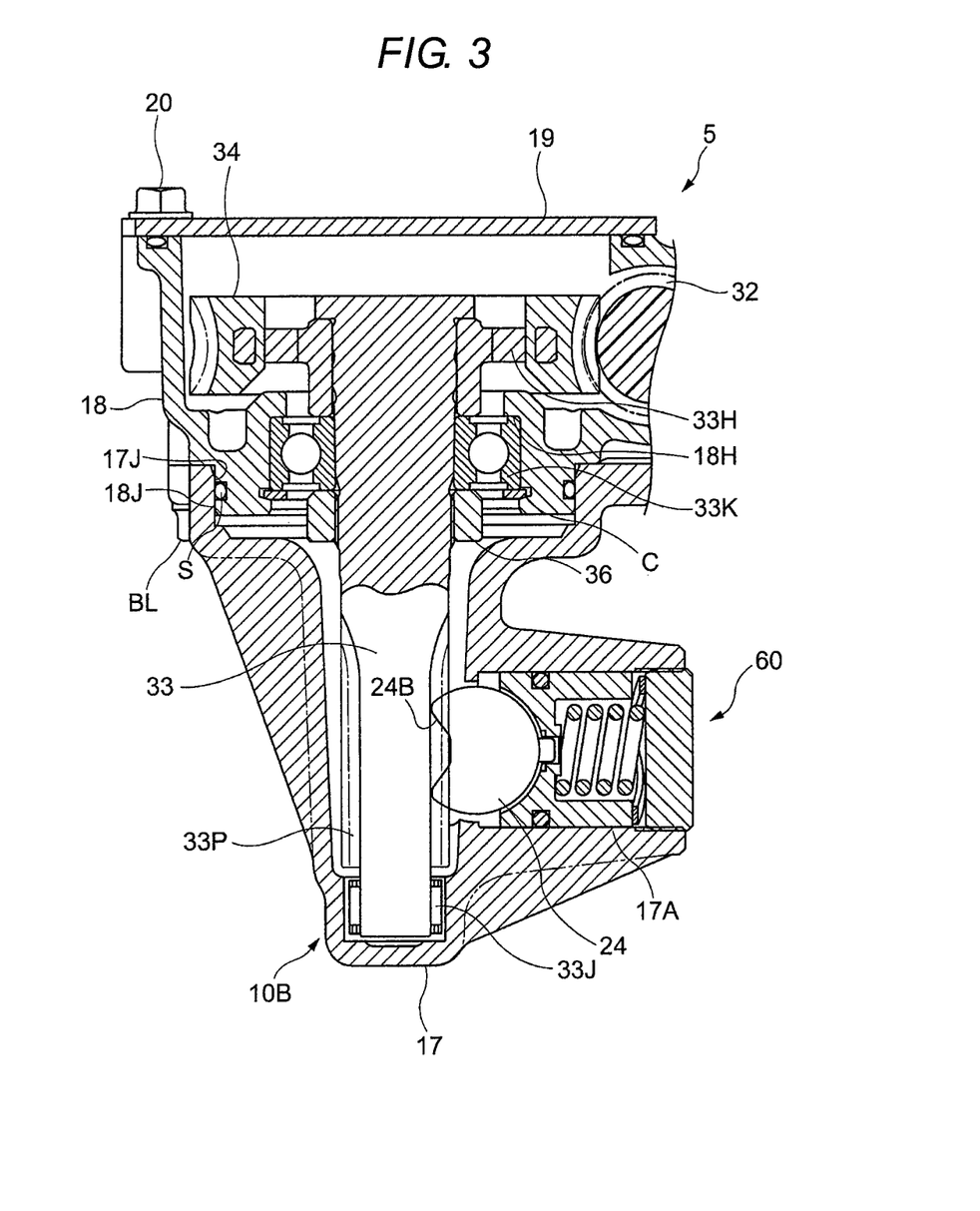
FIG. 3 is a configuration view illustrating an assisting unit of the motor-driven power steering apparatus of the embodiment.

FIG. 1 is a schematic top view of a motor-driven power steering apparatus 1 of an embodiment. FIG. 2 is a configuration view describing a transmission mechanism unit 3 of the motor-driven power steering apparatus 1 of the embodiment, is a cross-sectional view taken along line II-II in FIG. 1. FIG. 3 is a configuration view of an assisting unit 5 of the motor-driven power steering apparatus 1 of the embodiment, and is a cross-sectional view taken along line III-III in FIG. 1.

As illustrated in FIG. 1, the motor-driven power steering apparatus 1 of the embodiment is a so-called dual pinion power steering apparatus. The motor-driven power steering apparatus 1 has a transmission mechanism unit 3 that transmits a steering force from a steering unit (a steering wheel) to a rack shaft 24, and an assisting unit 5 that transmits a steering assistance force from a drive unit 30 to the rack shaft 24, thereby assisting the movement of the rack shaft 24.

In the following description, a longitudinal direction simply refers to a longitudinal direction of the rack shaft 24, and a circumferential direction simply refers to a circumferential direction of the rack shaft 24 about its center axis.

A gear housing (housing) 10 is divided into a plurality of portions in the axial direction. Specifically, the gear housing 10 illustrated in FIG. 1 has a first housing (a first housing portion) 10A that supports a steering wheel-side pinion shaft 23 (refer to FIG. 2) of the transmission mechanism unit 3; a second housing (a second housing portion) 10B that is connected to the first housing 10A, and supports an assist side pinion shaft 33 (refer to FIG. 3) of the assisting unit 5; and a third housing (a third housing portion) 10C that is connected to the second housing 10B on a side opposite to the first housing 10A, with the second housing 10B interposed between the first and third housings, and includes a second leg portion 10E (to be described).

The gear housing 10 has a first leg portion 10D and the second leg portion 10E which are fixed portions (other fixed portions) fixed to a vehicle body frame 9 (refer to FIG. 5) with bolts (not illustrated). In the example illustrated, the first leg portion 10D and the second leg portion 10E are respectively provided at different positions in the axial direction. Specifically, the first leg portion 10D is provided on the first housing 10A, and the second leg portion 10E is provided on the third housing 10C. In the example illustrated, the first leg portion 10D and the second leg portion 10E are respectively formed integrally with the first housing 10A and the third housing 10C by using a die casting method. The first leg portion 10D and the second leg portion 10E which are manufactured as separate bodies may be respectively fixed to the first housing 10A and the third housing 10C.

The second housing 10B is not provided with a fixed portion. That is, in the example illustrated, the second housing 10B does not have any one of the first leg portion 10D and the second leg portion 10E.

The first housing 10A, the second housing 10B, and the third housing 10C have a cylinder portion 11A, a cylinder portion 17A, and a cylinder 29A, respectively, each of which has a substantially cylindrical shape, and which accommodate the rack shaft 24 while allowing the rack shaft 24 to move in the axial direction (in a lateral direction of a vehicle, in a crosswise direction in FIG. 1).

The gear housing 10 is configured when the first housing 10A, the second housing 10B, and the third housing 10C are connected to each other in the longitudinal direction of the rack shaft 24. Specifically, the first housing 10A and the second housing 10B are connected to each other via a first connection portion 10G. The second housing 10B and the third housing 10C are connected to each other via a second connection portion 10H. The first connection portion 10G and the second connection portion 10H are described in detail later.

Right and left tie rods 48A and 48B are respectively connected to opposite end portions of the rack shaft 24. The tie rods 48A and 48B are respectively connected to tires (not illustrated) which are steered units, via respective knuckle arms (not illustrated). The rack shaft 24 is supported by bearings (not illustrated) which are respectively provided in a first member 11 (refer to FIG. 2) of the first housing 10A and in a first member 17 of the second housing 10B (refer to FIG. 3), while the slidability of the rack shaft 24 in the crosswise direction in FIG. 1 is well maintained.

Configuration and Function of Transmission Mechanism Unit 3

As illustrated in FIG. 2, the first housing 10A of the transmission mechanism unit 3 is divided into the first member 11, a second member 12, and a third member 13. The first member 11, the second member 12, and the third member 13 are assembled together, thereby forming a housing that is an accommodating portion. The first member 11, the second member 12, and the third member 13 are fixed together with fixing bolts (not illustrated).

As illustrated in FIG. 2, the transmission mechanism unit 3 has an input shaft 21 connected to the steering wheel (not illustrated). The transmission mechanism unit 3 has the steering wheel-side pinion shaft (an output shaft, a first pinion shaft) 23 that is connected to the input shaft 21 via a torsion bar 22, and that is coaxial with the input shaft 21.

The steering wheel-side pinion shaft 23 has a pinion 23P, and the pinion (a first pinion) 23P meshes with a steering wheel-side rack 24A of the rack shaft 24. Accordingly, the rack shaft 24 can linearly move as a steering torque is exerted on the steering wheel, and moves in the crosswise direction of the gear housing 10 illustrated in FIG. 1. The first member 11 accommodates a connection portion (a meshing portion) between the steering wheel-side pinion shaft 23 and the rack shaft 24 therein.

The input shaft 21 is held by a bearing 21J provided in the third member 13 of the first housing 10A. The steering wheel-side pinion shaft 23 is held by a bearing 23J provided in the first member 11 of the first housing 10A, and a bearing 23K provided in the second member 12.

A rack guide 50 is provided in the first member 11 of the first housing 10A so as to push the steering wheel-side rack 24A of the rack shaft 24 against the pinion 23P of the steering wheel-side pinion shaft 23, and so as to slidably support the rack shaft 24. The rack guide 50 is inserted into the cylinder portion 11A of the first member 11.

The transmission mechanism unit 3 includes a torque detecting device 40 that detects a relative rotation angle between the input shaft 21 and the steering wheel-side pinion shaft (the output shaft) 23, and that detects a steering torque based on the detected relative rotation angle. The torque detecting device 40 sends the detected results of the steering torque to an electronic control unit (ECU) which is not illustrated. The ECU controls the drive unit 30 (refer to FIG. 1) of the assisting unit 5 based on the detected results of the steering torque acquired from the torque detecting device 40.

Configuration and Function of Assisting Unit 5

As illustrated in FIG. 3, the assisting unit 5 includes the second housing 10B; the assist side pinion shaft 33; a worm wheel 34 that is connected to the assist side pinion shaft 33; and the drive unit 30 (refer to FIG. 1) that drives the rotation of the worm wheel 34. The assisting unit 5 has a rack guide 60 that guides the movement of the rack shaft 24 connected to the assist side pinion shaft 33.

As illustrated in FIG. 3, the second housing 10B is divided into the first member 17 and a second member 18. The first member 17 and the second member 18 are assembled together, thereby forming a housing that is an accommodating portion.

A cover member 19 is assembled to the second member 18. A cylindrical space is formed inside each of the first member 17 and the second member 18. The first member 17 forms a housing mainly for a connection portion (a meshing portion) between the assist side pinion shaft 33 and the rack shaft 24. The second member 18 forms a housing mainly for a connection portion between the assist side pinion shaft 33 and the worm wheel 34.

The first member 17 has a fitting portion 17J through which the first member 17 and the second member 18 are fitted together. The second member 18 has a fitting portion 18J through which the second member 18 and the first member 17 are fitted together. In the embodiment, the fitting portion 18J has an outer diameter slightly smaller than the inner diameter of the fitting portion 17J. The fitting portion 18J is inserted into the fitting portion 17J with a sealing member S interposed therebetween, and thus the first member 17 and the second member 18 are fitted together. The first member 17 and the second member 18 are fixed together with fixing bolts BL.

As illustrated in FIG. 3, the cover member 19 is fixed to the second member 18 by using fixing bolts 20. The cover member 19 is provided to cover an opening portion of the first member 17.

The assist side pinion shaft 33 mounted in the vehicle is disposed to intersect a vertical direction. In the embodiment, the assist side pinion shaft 33 is placed in a substantially horizontal direction so as to lie along a longitudinal direction of the vehicle (refer to FIG. 1).

As illustrated in FIG. 3, the assist side pinion shaft (a second pinion shaft) 33 has a pinion (a second pinion) 33P. The pinion 33P of the assist side pinion shaft 33 is connected to an assist side rack 24B of the rack shaft 24. In the assisting unit 5 of the embodiment, at least one of the pinion 33p of the assist side pinion shaft 33 and the assist side rack 24B of the rack shaft 24 is a helical gear, the tooth helix of which obliquely intersects its center axis. In the embodiment, the assist side pinion shaft 33 is made of metal.

The assist side pinion shaft 33 is provided with the worm wheel 34. The assist side pinion shaft 33 receives a rotation driving force from the drive unit 30 via the worm wheel 34 so as to rotate.

One end of the assist side pinion shaft 33 is held by a first bearing 33J provided in the first member 17. The other end of the assist side pinion shaft 33 is held by a second bearing 33K provided in the second member 18.

The inner ring of the second bearing 33K is attached onto the outer circumference of the assist side pinion shaft 33 with the inner ring interposed between a hub 33H and a lock nut 36 of the assist side pinion shaft 33. The outer ring of the second bearing 33K is fixed to the second member 18 with the outer ring interposed between a holding portion 18H formed in the second member 18 and a circlip C.

In contrast, the outer ring of the first bearing 33J is press fitted into the first member 17, and one end portion of the assist side pinion shaft 33 is loosely fitted into the inner ring of the first bearing 33J.

Since the assist side pinion shaft 33 is held by the first bearing 33J that is press fitted into the first member 17, the assist side pinion shaft 33 is limited to move toward the first member 17.

The inner ring of the second bearing 33K is fixed to the assist side pinion shaft 33 by using the lock nut 36 with a built-in screw. The outer ring of the second bearing 33K is fixed to the holding portion 18H of the second member 18 by using the circlip C. Accordingly, the assist side pinion shaft 33 is limited to move toward the second member 18.

As such, the assist side pinion shaft 33 is attached to the second housing 10B in such a manner that the assist side pinion shaft 33 is rotatably held but does not move in an axial direction of the assist side pinion shaft 33.

The worm wheel 34 is provided in the one end portion of the assist side pinion shaft 33, which is opposite to the pinion 33P formed on the assist side pinion shaft 33. The rotation axis of the worm wheel 34 is coaxial with the axis of the assist side pinion shaft 33. As illustrated in FIG. 3, the worm wheel 34 meshes with the worm gear 32 of the drive unit 30. In the embodiment, the worm wheel 34 is made of resin, and is formed integrally with the hub 33H of the metal assist side pinion shaft 33.

The rack guide 60 is attached to the first member 17 of the second housing 10B so as to push the assist side rack 24B of the rack shaft 24 against the pinion 33P of the assist side pinion shaft 33, and so as to slidably support the rack shaft 24. The rack guide 60 is inserted into the cylinder portion 17A of the first member 17.

As illustrated in FIG. 1, the drive unit 30 has an electric motor 31, and the worm gear 32 (refer to FIG. 3) that is driven to rotate by the electric motor 31. The ECU (not illustrated) controls the drive of the electric motor 31 based on the detection results from the torque detecting device 40 (refer to FIG. 2). As illustrated in FIG. 3, the worm gear 32 is connected to the worm wheel 34, and transmits an output torque from the electric motor 31 to the worm wheel 34.

In the motor-driven power steering apparatus 1 having the above-mentioned configuration, a steering torque exerted on the steering wheel is expressed in a relative rotation angel between the input shaft 21 and the steering wheel-side pinion shaft (the output shaft) 23, and thus the torque detecting device 40 detects the steering torque based on the relative rotation angle between the input shaft 21 and the steering wheel-side pinion shaft 23. That is, the ECU calculates the steering torque based on a value that the torque detecting device 40 outputs corresponding to the relative rotation angle between the input shaft 21 and the steering wheel-side pinion shaft 23, and the ECU controls the drive of the drive unit 30 based on the calculated steering torque.

The torque generated by the drive unit 30 is transmitted to the steering wheel-side pinion shaft 23, thereby applying an assistance force to the steering force that the driver exerts on the steering wheel. That is, the steering wheel-side pinion shaft 23 rotates due to the steering torque generated by the rotation of the steering wheel and the assistance torque exerted by the drive unit 30.

Configuration and Function of First Connection Portion 10G

Figure 4:
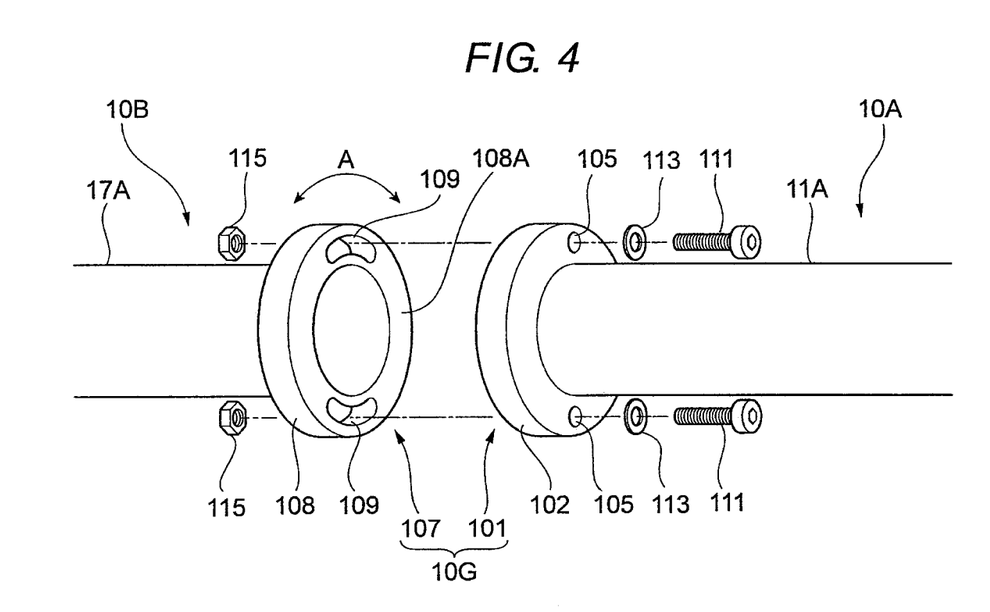
FIG. 4 is a configuration view describing a first connection portion of the motor-driven power steering apparatus of the embodiment.

FIG. 4 is a configuration view describing the first connection portion 10G of the motor-driven power steering apparatus 1 of the embodiment.

Subsequently, the first connection portion 10G connecting the first housing 10A and the second housing 10B will be described with reference to FIG. 4. The detailed description of the second connection portion 10H (refer to FIG. 1) will not be given, and the second connection portion 10H connecting the second housing 10B and the third housing 10C is also configured similarly to the first connection portion 10G.

As illustrated in FIG. 4, the first connection portion 10G includes a first flange 101 that is provided on one end in the longitudinal direction of the first housing 10A, and a second flange 107 that is provided on one end in the longitudinal direction of the second housing 10B. The first flange 101 and the second flange 107 are connected together with well-known fixing tools such as bolts 111, washers 113, and nuts 115, and thus the first housing 10A and the second housing 10B are integrated together.

Specifically, the first flange 101 includes a flange portion (a large-diameter portion) 102 that protrudes radially outwardly from an outer circumferential surface of the cylinder portion 11A of the first housing 10A, and pass-through holes 105 that pass through the flange portion 102 along the axial direction. In the example illustrated, a surface (not illustrated in FIG. 4) is formed at a tip of the flange portion 102 so as to be orthogonal to the axial direction. A plurality of (two) the pass-through holes 105 are disposed along a circumferential direction of the flange portion 102.

In contrast, the second flange 107 includes a flange portion 108 that protrudes radially outwardly from an outer circumferential surface of the cylinder portion 17A of the second housing 10B, and oblong holes 109 which pass through the flange portion 108 along the axial direction, and the longitudinal direction of which is formed along a circumferential direction of the flange portion 108. In the example illustrated, a surface 108A is formed at a tip of the flange portion 108 so as to be orthogonal to the axial direction. A plurality of (two) the oblong holes 109 are provided along the circumferential direction, and the oblong holes 109 are disposed at respective positions corresponding to the pass-through holes 105 of the first flange 101.

When the first housing 10A and the second housing 10B are connected together via the first connection portion 10G, first, the center axis of the first flange 101 overlaps the center axis of the second flange 107, and specifically, the surface at the tip of the flange portion 102 is in contact with a tip surface 108A of the flange portion 108. Subsequently, while the pass-through holes 105 of the first flange 101 are respectively aligned in position with the oblong holes 109 of the second flange 107, and center holes of the washers 113, the bolts 111 pass through the pass-through holes 105, the oblong holes 109, and the center holes, respectively, and are tightened together with the nuts 115, respectively. Accordingly, the first flange 101 and the second flange 107 are connected together.

In a state where the first connection portion 10G is not fully tightened (fixed) with the bolts 111 and the nuts 115, it is possible to adjust a relative circumferential position between the first flange 101 and the second flange 107, that is, a relative circumferential angle therebetween (refer to arrow A in FIG. 4). In other words, since the first flange 101 and the second flange 107 are interposed between the bolts 111 and the nuts 115, it is possible to change the relative circumferential position between the first housing 10A and the second housing 10B without changing a relative axial position between the first housing 10A and the second housing 10B.

Relationship Between Fixing Positions

Figure 5:
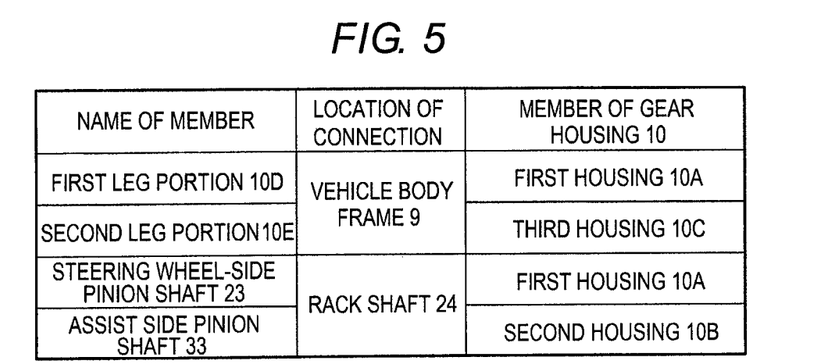
FIG. 5 is a table describing the configuration of members of the motor-driven power steering apparatus of the embodiment.

FIG. 5 is a table describing a relationship between the members of the motor-driven power steering apparatus 1 of the embodiment.

As illustrated in FIG. 5, the motor-driven power steering apparatus 1 of the embodiment (refer to FIG. 1) is fixed to the vehicle body frame 9 via a fixture to which the first leg portion 10D and the second leg portion 10E are fixed. That is, the respective positions of the first leg portion 10D and the second leg portion 10E are fixed relative to the vehicle body frame 9.

As described above, the pinion 23P of the steering wheel-side pinion shaft 23 is disposed in such a manner that the pinion 23P meshes with the steering wheel-side rack 24A (refer to FIG. 2) of the rack shaft 24 (refer to FIG. 2). The pinion 33P of the assist side pinion shaft 33 is disposed in such a manner that the pinion 33P meshes with the assist side rack 24B (refer to FIG. 3) of the rack shaft 24. Accordingly, the respective circumferential positions of the steering wheel-side pinion shaft 23 and the assist side pinion shaft 33 are fixed relative to the rack shaft 24. As described above, since the rack shaft 24 moves in the axial direction, the respective axial positions of the steering wheel-side pinion shaft 23 and the assist side pinion shaft 33 are changed relative to the rack shaft 24.

As illustrated in FIG. 5, the first leg portion 10D and the steering wheel-side pinion shaft 23 are provided in the first housing 10A. The second leg portion 10E is provided in the third housing 10C. The assist side pinion shaft 33 is provided in the second housing 10B.

Here, typically, the members of the motor-driven power steering apparatus 1 such as the rack shaft 24 may have dimensional variations due to the impact of manufacturing processes. Typically, due to the dimensional variations, a relative position between the first leg portion 10D and the second leg portion 10E which are fixed to the fixture (not illustrated) may deviate from a designed (theoretical) relative position in the circumferential direction. Similarly, for example, a relative position between assembly holes (not illustrated) of the gear housings (not illustrated) to which the steering wheel-side pinion shaft 23 and the assist side pinion shaft 33 are respectively assembled may deviate from a designed relative position in the circumferential direction.

Different from the embodiment, a configuration is assumed in which the gear housings (not illustrated) are integrally provided in the axial direction. In this configuration, for example, in a case where the dimensional variations occur when the first leg portion 10D and the second leg portion 10E are fixed to the fixture (not illustrated), the first leg portion 10D and the second leg portion 10E are not sufficiently fixed to the fixture, and thus a so-called endplay occurs in the first leg portion 10D and the second leg portion 10E. For example, in a case where the dimensional variations occur when the steering wheel-side pinion shaft 23 and the assist side pinion shaft 33 are respectively assembled to the assembly holes (not illustrated) of the gear housing, it is assumed that the rack shaft 24 supported by the gear housing does not sufficiently mesh with the steering wheel-side pinion shaft 23 and the assist side pinion shaft 33.

In contrast, in the embodiment, the gear housing 10 has the first housing 10A, the second housing 10B, and the third housing 10C. The first housing 10A, the second housing 10B, and the third housing 10C are connected together via the first connection portion 10G and the second connection portion 10H.

Relative circumferential positions (angles) among the first housing 10A, the second housing 10B, and the third housing 10C are adjusted, thereby it is possible to adjust a relative circumferential position between the steering wheel-side pinion shaft 23 provided in the first housing 10A and the assist side pinion shaft 33 provided in the second housing 10B, while adjusting a relative circumferential position between the first leg portion 10D provided on the first housing 10A and the second leg portion 10E provided on the third housing 100. Accordingly, the steering wheel-side pinion shaft 23 and the assist side pinion shaft 33 mesh well with the rack shaft 24, and the attachment precision of the motor-driven power steering apparatus 1 (refer to FIG. 1) is prevented from deteriorating.

In addition, in the embodiment, after the respective circumferential positions of the first housing 10A to the third housing 100 are adjusted, it is possible to adjust the alignment of each of the steering wheel-side pinion shaft 23 and the assist side pinion shaft 33 with respect to the rack shaft 24, and to adjust the alignment of each of the first leg portion 10D and the second leg portion 10E with respect to the vehicle body frame 9. In other words, in the embodiment, it is possible to absorb an alignment error in the ridge mount of a rack and pinion (the rack shaft 24 and the steering wheel-side pinion shaft 23, and the rack shaft 24 and the assist side pinion shaft 33) by adjusting the respective circumferential positions of the first housing 10A to the third housing 10C.

Assembly Method

Figure 6A:
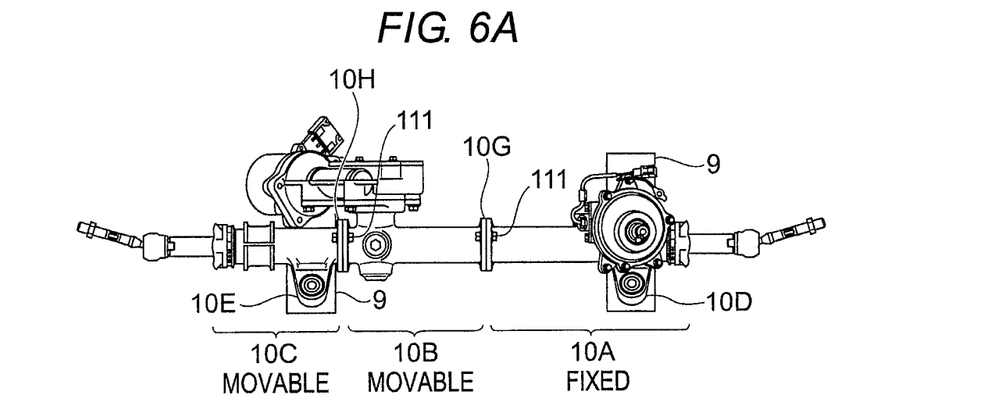
FIGS. 6A to 6C are views describing a method of assembling the motor-driven power steering apparatus of the embodiment.
Figure 6B:
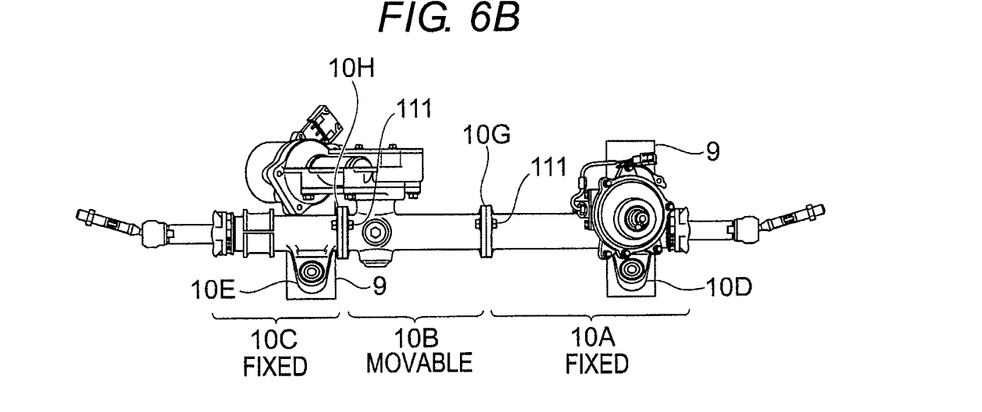
Figure 6C:
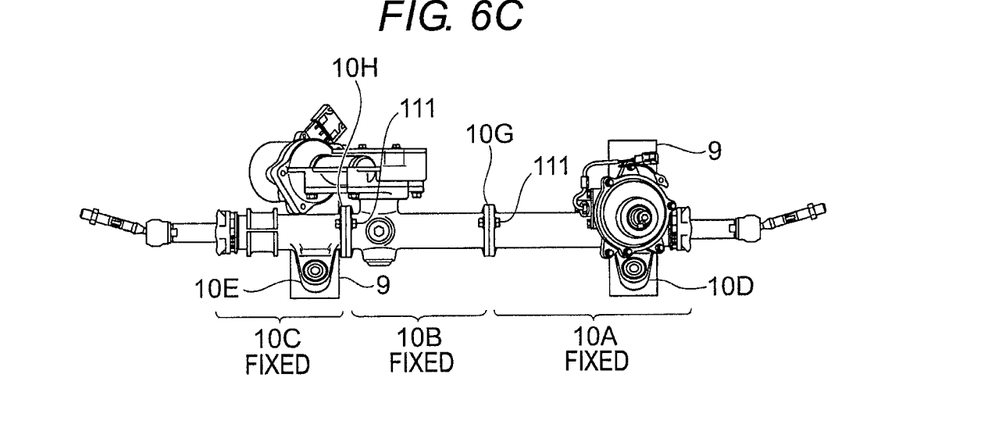

FIGS. 6A to 6C are views describing a method of assembling the motor-driven power steering apparatus 1 of the embodiment.

Subsequently, the method of assembling the motor-driven power steering apparatus 1 of the embodiment will be described with reference to FIGS. 6A to 6C.

First, when the assembly of the motor-driven power steering apparatus 1 is not completed, the bolts 111 of the first connection portion 10G and the second connection portion 10H are loose from their fully tightened positions. More specifically, the bolts 111 are loose to the extent that it is possible to change the relative circumferential position (angle) among the first housing 10A to the third housing 10C without changing the relative axial position therebetween.

In this state, the respective positions of the second housing 10B and the third housing 10C are adjusted with the first housing 10A as a datum member of the adjustment.

Specifically, as illustrated in FIG. 6A, the first leg portion 10D provided on the first housing 10A is fixed to the fixture (not illustrated) by using a bolt (not illustrated). Accordingly, the position of the first housing 10A is fixed. Since the first housing 10A is fixed, the position of the steering wheel-side pinion shaft 23 is also fixed. The position of the rack shaft 24 is aligned with respect to the fixed steering wheel-side pinion shaft 23. Specifically, the circumferential angle of the rack shaft 24 is adjusted.

Subsequently, as illustrated in FIG. 6B, the second leg portion 10E provided on the third housing 10C is fixed to the fixture (not illustrated) by using a bolt (not illustrated). Accordingly, the respective positions of the first housing 10A and the third housing 10C are fixed. At this time, the axial position of the second housing 20B interposed between the first housing 10A and the third housing 10C is fixed. In contrast, the circumferential position of the second housing 10B can be changed (moved).

Subsequently, as illustrated in FIG. 6C, the position of the assist side pinion shaft 33 is adjusted with respect to the rack shaft 24. At this time, the circumferential angle of the assist side pinion shaft 33 is adjusted while the circumferential angle of the rack shaft 24 is not changed, the position of which is aligned with respect to the steering wheel-side pinion shaft 23. After the angle of the assist side pinion shaft 33 is adjusted with respect to the rack shaft 24, the bolts 111 of the first connection portion 10G and the second connection portion 10H are tightened. Accordingly, the respective positions of the first housing 10A to the third housing 10C are fixed.

In the above-mentioned fixing method, opposite ends of the second housing 10B, that is, the first housing 10A and the third housing 10C are fixed, and thus the position of the second housing 10B is fixed. That is, after the first leg portion 10D and the second leg portion 10E are respectively fixed with respect to the fixture (not illustrated), the position of the assist side pinion shaft 33 is adjusted. Accordingly, since the circumferential position of the assist side pinion shaft 33 is adjusted in a state where the position of the second housing 10B is limited to move in the axial direction, it is easy to adjust the position of the assist side pinion shaft 33.

In the above-mentioned fixing method, in a state where the position of the steering wheel-side pinion shaft 23 is fixed, the position of the assist side pinion shaft 33 is adjusted. Here, as described above, the assist side pinion shaft 33 disconnected from the input shaft 21 (refer to FIG. 1) has a degree of freedom in a circumferential position higher than that of the steering wheel-side pinion shaft 23 connected to the input shaft 21 via the torsion bar 22 (refer to FIG. 2). Accordingly, since the assist side pinion shaft 33 is adjusted in a state where the steering wheel-side pinion shaft 23 is fixed, it is easy to adjust the respective positions of the steering wheel-side pinion shaft 23 and the assist side pinion shaft 33.

In the description above, after the first leg portion 10D provided on the first housing 10A is fixed to the fixture (not illustrated), and the position of the rack shaft 24 is aligned with respect to the steering wheel-side pinion shaft 23, the second leg portion 10E provided on the third housing 10C is fixed to the fixture, and the position of the assist side pinion shaft 33 is adjusted with respect to the rack shaft 24. However, the present invention is not limited to the above-mentioned fixing method. For example, the fixing method may be configured as follows: after the first leg portion 10D provided on the first housing 10A is fixed to the fixture, and the second leg portion 10E provided on the third housing 10C is fixed to the fixture, the position of the rack shaft 24 is aligned with respect to the steering wheel-side pinion shaft 23, and then the position of the second housing 10B is adjusted, and thus the position of the assist side pinion shaft 33 is adjusted with respect to the rack shaft 24. In other words, after the respective positions of the first housing 10A and the third housing 10C are fixed, the position of the second housing 10B may be adjusted and fixed with respect to the first housing 10A and the third housing 10C.

In the description above, the motor-driven power steering apparatus 1 is fixed to the fixture.

Here, the motor-driven power steering apparatus 1 fixed to the fixture may be fixed to the vehicle body frame 9 with the fixture removed, or may be fixed to the vehicle body frame 9 along with the fixture.

An object for the fixation of the motor-driven power steering apparatus 1 can preferably support the first leg portion 10D of the first housing 10A, and the second leg portion 10E of the third housing 10C. For example, the first leg portion 10D of the first housing 10A and the second leg portion 10E of the third housing 10C may be assembled while being fixed to the vehicle body frame 9 instead of the fixture.

The fixture (not illustrated) described above preferably has flat attachment surfaces to which the first leg portion 10D and the second leg portion 10E are respectively attached. In addition, the respective attachment surfaces of the fixture for the first leg portion 10D and the second leg portion 10E may be provided at different positions in the circumferential direction, or may be formed in different directions.

Other Embodiments

Figure 7A:
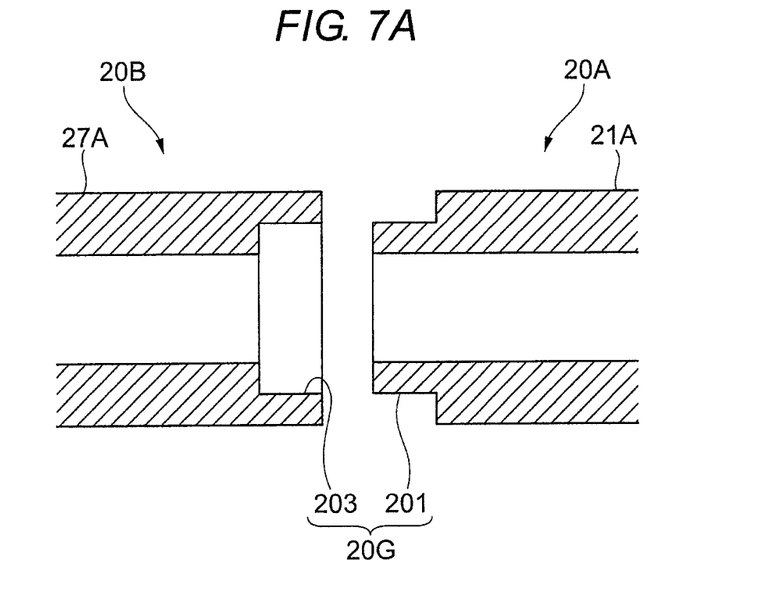
FIGS. 7A and 7B are configuration views describing first connection portions of other embodiments.
Figure 7B:
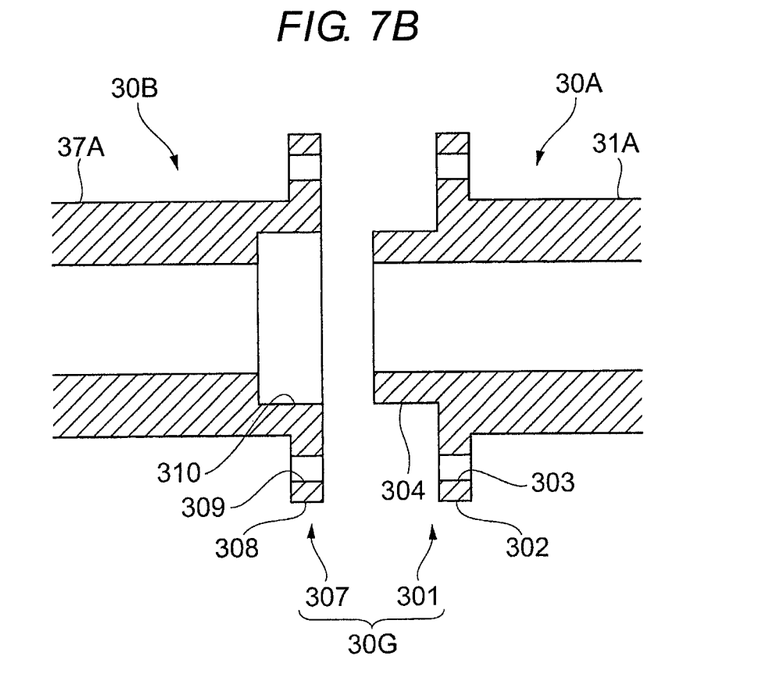

FIGS. 7A and 7B are configuration views describing first connection portions 20G and 30G of other embodiments.

Subsequently, the other embodiments of the first connection portion 10G (refer to FIG. 4) according to the embodiment will be described with reference to FIGS. 7A and 7B.

First, as illustrated in FIG. 7A, the first connection portion 20G includes a small-diameter portion 201 that has a diameter smaller than the outer diameter of a cylinder portion 21A provided on one end in the longitudinal direction of a first housing 20A, and a large-diameter portion 203 in which the inner diameter of a cylinder portion 27A provided on one end in the longitudinal direction of a second housing 20B is large, and which has a fitting dimension suitable for the outer diameter of the small-diameter portion 201 to be inserted into the large-diameter portion 203.

The small-diameter portion 201 is inserted and fitted (press fitted) into the large-diameter portion 203, and thus it is possible to connect the first housing 20A and the second housing 20B. The second housing 20B is circumferentially rotated (turned) with respect to the first housing 20A, and thus it is possible to change a relative circumferential position between the first housing 20A and the second housing 20B without changing a relative axial position therebetween.

As illustrated in FIG. 7B, the first connection portion 30G includes a first flange 301 provided on one end in the longitudinal direction of a first housing 30A, and a second flange 307 provided on one end in the longitudinal direction of a second housing 30B.

Here, the first flange 301 includes a flange portion 302 that protrudes radially outwardly from an outer circumferential surface of a cylinder portion 31A of the first housing 30A; a plurality of pass-through holes 303 that are circumferentially provided in the flange portion 302; and a small-diameter portion 304 that is provided on one end in the longitudinal direction of the flange portion 302 and has a diameter smaller than the outer diameter of the cylinder portion 31A.

The second flange 307 includes a flange portion 308 that protrudes radially outwardly from an outer circumferential surface of a cylinder portion 37A of the second housing 30B; a plurality of oblong holes 309 which are circumferentially provided in the flange portion 308, and the longitudinal direction of which is formed along the circumferential direction; and a large-diameter portion 310 in which the inner diameter of a cylinder portion 37A is enlarged on one end in the longitudinal direction of the second housing 303, and which has a fitting dimension suitable for the outer diameter of the small-diameter portion 304 to be inserted into the large-diameter portion 310.

In a state where the small-diameter portion 304 is fitted into the large-diameter portion 310, the second housing 30B is circumferentially rotated (turned) with respect to the first housing 30A, and thus it is possible to change a relative circumferential position between the first housing 30A and the second housing 30B without changing a relative axial position therebetween. After the relative circumferential position is adjusted, the bolts 111 (refer to FIG. 4) pass through the respective pass-through holes 303 of the first flange 301, and the respective oblong holes 309 of the second flange 307. Accordingly, it is possible to connect the first flange 301 and the second flange 307, and to prevent a change in relative circumferential position and a change in relative axial position.

In the description above, the first housing 30A and the second housing 30B are fixed together with the bolts 111. However, insofar as it is possible to circumferentially rotate the first housing 30A and the second housing 30B in a state where an end portion of the first housing 30A is in contact with an end portion of the second housing 30B, and to fix the relative circumferential position and the relative axial position, a well-known fixing mechanism such as welding or adhesion may be used.

The first connection portion 10G (refer to FIG. 1) and the second connection portion 10H (refer to FIG. 1) may adopt different fixing mechanisms. For example, the motor-driven power steering apparatus 1 illustrated in FIG. 1 may include the first connection portion 30G illustrated in FIG. 7B instead of the first connection portion 10G, and the first connection portion 20G illustrated in FIG. 7B instead of the second connection portion 10H.

Figure 8A:
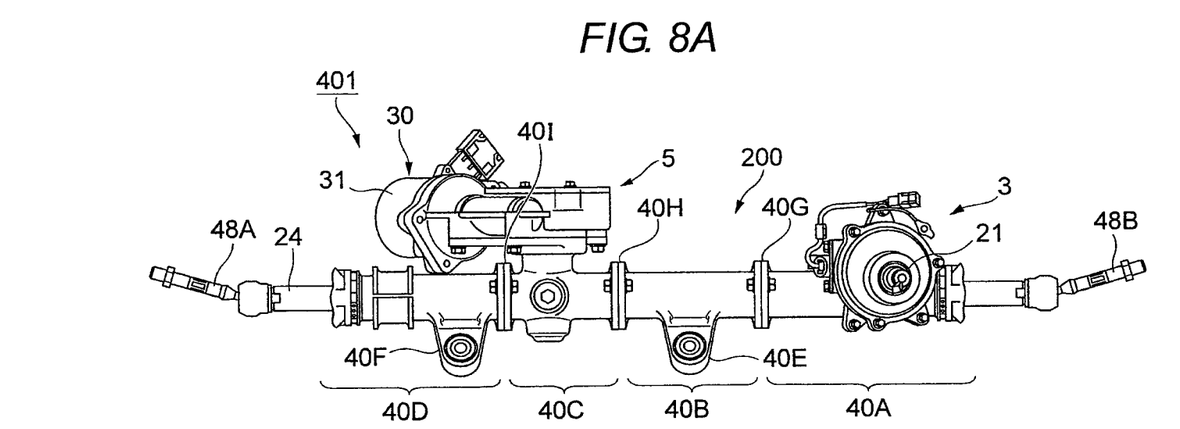
FIGS. 8A and 8B are configuration views describing motor-driven power steering apparatuses of other embodiments.
Figure 8B:
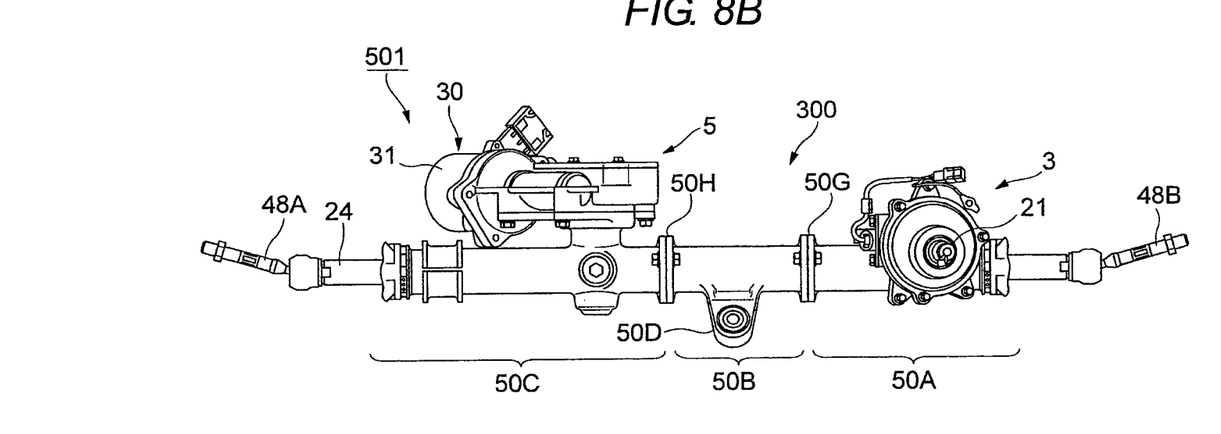

FIGS. 8A and 8B are configuration views describing motor-driven power steering apparatuses 401 and 501 of other embodiments.

Subsequently, the other embodiments of the motor-driven power steering apparatus 1 (refer to FIG. 1) according to the embodiment will be described with reference to FIGS. 8A and 8B. In FIGS. 8A and 8B, the same reference signs are assigned to the same configuration members as those of the embodiment illustrated in FIG. 1, and the descriptions thereof will be omitted.

First, as illustrated in FIG. 8A, a housing 200 of the motor-driven power steering apparatus 401 may be divided into four or more housings in the axial direction. The housing 200 illustrated in FIG. 8A has a first housing 40A that supports the steering wheel-side pinion shaft 23 (refer to FIG. 2); a second housing 40B that is connected to the first housing 40A and includes a first leg portion 40E; a third housing 40C that is connected to the second housing 40B and supports the assist side pinion shaft 33 (refer to FIG. 3); and a fourth housing 40D that is connected to the third housing 40C and includes a second leg portion 40F.

The first housing 40A and the second housing 40B are connected together via a first connection portion 40G. The second housing 40B and the third housing 40C are connected together via a second connection portion 40H. The third housing 40C and the fourth housing 40D are connected together via a third connection portion 40I.

For example, the motor-driven power steering apparatus 401 is fixed to the vehicle body frame 9 (refer to FIG. 6) by the following method. That is, the first leg portion 40E (the second housing 40B) and the second leg portion 40F (the fourth housing 40D) are fixed to the vehicle body frame 9 (refer to FIG. 6). The position of the rack shaft 24 is adjusted with respect to the steering wheel-side pinion shaft 23 (refer to FIG. 2), and then the first housing 40A is fixed via the first connection portion 40G. Subsequently, the position of the assist side pinion shaft 33 (refer to FIG. 3) is adjusted with respect to the rack shaft 24, and then the third housing 40C is fixed via the second connection portion 40H and the third connection portion 40I.

Since the housing 200 is divided into four or more housings as described above, it is possible to finely adjust the respective circumferential positions of the members of the motor-driven power steering apparatus 401.

As illustrated in FIG. 8B, the motor-driven power steering apparatus 501 may be provided with only one first leg portion 50D in the axial direction.

In the example illustrated, a housing 300 has a first housing 50A that supports the steering wheel-side pinion shaft 23 (refer to FIG. 2); a second housing 50B that is connected to the first housing 50A and includes the first leg portion 50D; and a third housing 50C that is connected to the second housing 50B and supports the assist side pinion shaft 33 (refer to FIG. 3).

The first housing 50A and the second housing 50B are connected together via a first connection portion 50G. The second housing 50B and the third housing 50C are connected together via a second connection portion 50H.

For example, the motor-driven power steering apparatus 501 is fixed to the vehicle body frame 9 (refer to FIG. 6) by the following method. That is, the first leg portion 50D (the second housing 50B) is fixed to the vehicle body frame 9. The position of the rack shaft 24 is adjusted with respect to the steering wheel-side pinion shaft 23, and then the first housing 50A is fixed via the first connection portion 50G. Subsequently, the position of the assist side pinion shaft 33 is adjusted with respect to the rack shaft 24, and then the third housing 50C is fixed via the second connection portion 50H.

Since only one first leg portion 50D is provided in the axial direction as described above, it is easy to fix the motor-driven power steering apparatus 501.

In the descriptions above, as illustrated in FIG. 1, the two leg portions such as the first leg portion 10D and the second leg portion 10E are provided, or as illustrated in FIG. BA, the two leg portions such as the first leg portion 40E and the second leg portion 40F are provided, or as illustrated in FIG. 8B, only one leg portion such as the first leg portion 50D is provided. However, the motor-driven power steering apparatus may include three or more leg portions. Alternatively, only one housing (for example, the first housing 10A in FIG. 1) may include a plurality of leg portions.

The descriptions above illustrate the embodiment and the modification examples, but the embodiment and the modification examples may be combined together.

The disclosure is not limited to the embodiments, and embodiments can be implemented in various forms insofar as the various embodiments do not depart from the scope of the disclosure.

What is claimed is:

1. A power steering apparatus comprising:
   a rack shaft that has a rack and moves a steered unit;
   a first pinion shaft that has a first pinion meshing with the rack of the rack shaft, and rotates as a steering unit is turned;
   a second pinion shaft that has a second pinion meshing with the rack of the rack shaft, and is driven to rotate by a drive unit, thereby assisting the rotation of the first pinion shaft; and
   a housing that accommodates the rack shaft, and has a fixed portion fixed to a vehicle,
   wherein the housing comprises:
      a first housing portion that accommodates a meshing portion between the rack shaft and the first pinion shaft;
      a second housing portion that is a separate body from the first housing portion, and accommodates a meshing portion between the rack shaft and the second pinion shaft; and
      a third housing portion that is a separate body from the first and second housing portions, and is provided with the fixed portion.

2. The power steering apparatus according to claim 1, wherein any one of the first and second housing portions has another fixed portion attached to the vehicle.

3. The power steering apparatus according to claim 2, wherein the first housing portion has the another fixed portion.

4. The power steering apparatus according to claim 3, wherein the first housing portion is provided opposite to the third housing portion in an axial direction of the rack shaft with the second housing portion interposed between the first and third housing portions.

5. The power steering apparatus according to claim 4, wherein each of the first to third housing portions comprises a fixing mechanism through which each of the relative positions among the first to third housing portions can be changed in a circumferential direction of the rack shaft.

6. The power steering apparatus according to claim 3, wherein each of the first to third housing portions comprises a fixing mechanism through which each of the relative positions among the first to third housing portions can be changed in a circumferential direction of the rack shaft.

7. The power steering apparatus according to claim 2, wherein the first housing portion is provided opposite to the third housing portion in an axial direction of the rack shaft with the second housing portion interposed between the first and third housing portions.

8. The power steering apparatus according to claim 7, wherein each of the first to third housing portions comprises a fixing mechanism through which each of the relative positions among the first to third housing portions can be changed in a circumferential direction of the rack shaft.

9. The power steering apparatus according to claim 2, wherein each of the first to third housing portions comprises a fixing mechanism through which each of the relative positions among the first to third housing portions can be changed in a circumferential direction of the rack shaft.

10. The power steering apparatus according to claim 1, wherein the first housing portion is provided opposite to the third housing portion in an axial direction of the rack shaft with the second housing portion interposed between the first and third housing portions.

11. The power steering apparatus according to claim 10, wherein each of the first to third housing portions comprises a fixing mechanism through which each of the relative positions among the first to third housing portions can be changed in a circumferential direction of the rack shaft.

12. The power steering apparatus according to claim 1, wherein each of the first to third housing portions comprises a fixing mechanism through which each of the relative positions among the first to third housing portions can be changed in a circumferential direction of the rack shaft.

13. A method of assembling a power steering apparatus comprising
a rack shaft that has a rack and moves a steered unit;
a first pinion shaft that has a first pinion meshing with the rack of the rack shaft, and rotates as a steering unit is turned;
a second pinion shaft that has a second pinion meshing with the rack of the rack shaft, and is driven to rotate by a drive unit, thereby assisting the rotation of the first pinion shaft; and
a housing that accommodates the rack shaft, and has a plurality of fixed portions fixed to a vehicle, the plurality of fixed portions comprising a first fixed portion and a second fixed portion
wherein the housing comprises:
a first housing portion that accommodates a meshing portion between the rack shaft and the first pinion shaft, and that is provided with the first fixed portion;
a second housing portion that is a separate body from the first housing portion, and that accommodates a meshing portion between the rack shaft and the second pinion shaft; and
a third housing portion that is a separate body from the first and second housing portions, and that is provided with the second fixed portion,
the method comprising:
fixing the first fixed portion of the first housing portion to a fixture;
fixing the second fixed portion of the third housing portion to the fixture; and
adjusting the meshing between the rack shaft and the first pinion shaft, and, after the adjusting of the meshing between the rack shaft and the first pinion shaft, adjusting the meshing between the rack shaft and the second pinion shaft.

14. The method of assembling a power steering apparatus according to claim 13,
wherein the first housing portion is provided opposite to the third housing portion in an axial direction of the rack shaft with the second housing portion interposed between the first and third housing portions.

15. The method of assembling a power steering apparatus according to claim 14,
wherein after an adjustment is performed on the meshing between the first pinion shaft and the rack shaft which is supported by the first and third housing portions, the respective first and second fixed portions of which are fixed to the fixture, the position of the second housing portion is adjusted, thereby adjusting the meshing of the second pinion shaft with respect to the rack shaft.

16. The method of assembling a power steering apparatus according to claim 13,
wherein after an adjustment is performed on the meshing between the first pinion shaft and the rack shaft which is supported by the first and third housing portions, the respective first and second fixed portions of which are fixed to the fixture, the position of the second housing portion is adjusted, thereby adjusting the meshing of the second pinion shaft with respect to the rack shaft.

* * * * *